(12) United States Patent
Chow et al.

(10) Patent No.: US 10,289,792 B1
(45) Date of Patent: May 14, 2019

(54) SYSTEMS AND METHODS FOR CLUSTERING PINS FOR POWER

(71) Applicant: Cadence Design Systems, Inc., San Jose, CA (US)

(72) Inventors: Wing-Kai Chow, Austin, TX (US); Wen-Hao Liu, Cedar Park, TX (US); Gracieli Posser, Austin, TX (US); Mehmet Can Yildiz, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 66 days.

(21) Appl. No.: 15/636,410

(22) Filed: Jun. 28, 2017

(51) Int. Cl.
*G06F 17/50* (2006.01)

(52) U.S. Cl.
CPC ...... *G06F 17/5072* (2013.01); *G06F 17/5036* (2013.01)

(58) Field of Classification Search
CPC .......................... G06F 17/5072; G06F 17/5036
USPC ............... 716/122, 124, 125, 130, 131, 129; 703/15, 16
See application file for complete search history.

(56) References Cited

U.S. PATENT DOCUMENTS

| | | | | |
|---|---|---|---|---|
| 5,361,214 A | * | 11/1994 | Aoki ................... | G06F 17/5077 716/129 |
| 8,201,128 B2 | * | 6/2012 | Scheffer .............. | G06F 17/5072 716/124 |
| 9,852,257 B1 | * | 12/2017 | Chavva ............... | G06F 17/5077 |
| 2003/0066043 A1 | * | 4/2003 | Teig ..................... | G06F 17/5077 716/129 |
| 2004/0216072 A1 | * | 10/2004 | Alpert ................. | G06F 17/5077 716/114 |
| 2007/0058865 A1 | * | 3/2007 | Li ........................ | G06K 9/4638 382/173 |
| 2009/0222782 A1 | * | 9/2009 | Bayati .................. | G06F 17/509 716/125 |

\* cited by examiner

*Primary Examiner* — Phallaka Kik
(74) *Attorney, Agent, or Firm* — Schwegman Lundberg & Woessner, P.A.

(57) ABSTRACT

Various embodiments provide for clustering pins of a circuit design for connection to a power-ground network (PG) of the circuit design using a nearest neighbor graph. Pin clustering, according to some embodiments, can minimize wirelength, minimize a number of vias, satisfy constraints relating to a pin count (e.g., maximum number of pins per power-ground access point), and satisfy constraints relating to a bounding box size.

20 Claims, 10 Drawing Sheets

200

202 — Generate a Set of Pin Clusters for Identified Pins of a Circuit Design Including a Power-Ground Network by Associating Each Pin with its own Pin Cluster 204 — Maintain a Set of Cluster Costs for Generated Pin Clusters, Where Each Generated Pin Cluster is Associated with a Cluster Cost that Includes a Minimum Cost of Connecting the Generated Pin Cluster to the Power-Ground Network 206 — Generate a Nearest Neighbor Graph Based on Identified Pins and Maintained Cluster Costs Where an Edge Cost of an Edge Between Two Pins Represents a Cluster Cost for a Merged Pin Cluster Resulting from Merging Different Pin Clusters Associated with Those Two Pins 208 — Update a Set of Pin Clusters by Merging at least Two Pin Clusters Based on the Nearest Neighbor Graph and the Set of Cluster Costs

FIG. 2

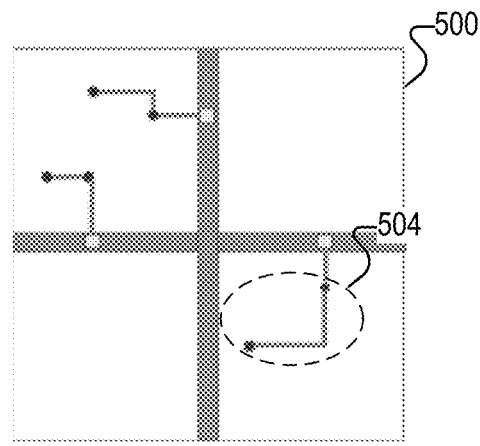
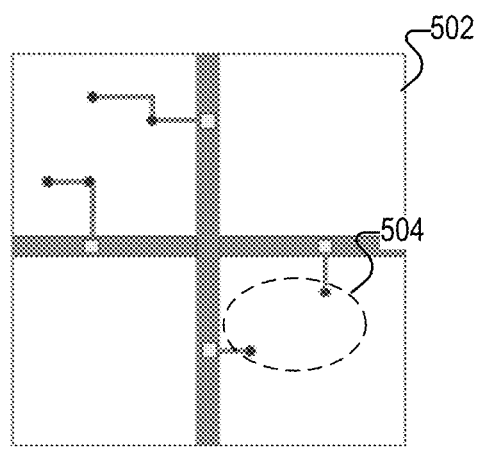
FIG. 5

SYSTEMS AND METHODS FOR CLUSTERING PINS FOR POWER

TECHNICAL FIELD

Embodiments described herein relate to circuit design and, more particularly, to systems, methods, devices, and instructions for clustering pins of a circuit design for power-ground network connection, which may be part of electronic design automation (EDA).

BACKGROUND

As part of circuit design, electronic design automation (EDA) software systems commonly perform placement and routing to map the logic of a circuit design to a physical implementation of the circuit design. These processes can impact various aspects of the physical implementation including, without limitation, one or more of area usage, timing delays, and power consumption by included circuit components and data paths (e.g., nets) therebetween, all of which can impact actual performance of the physical circuit.

Clustering, which is typically a part of the placement process, can group or associate a plurality of circuit components (e.g., highly connected cells) into a clustered component, which in turn can be treated as a single component for placement and routing purposes. Clustering can determine the quality of circuit component placement (e.g., with respect to area usage, timing delays, or power consumption), can ensure that a physical implementation of a circuit design meets various design constraints (e.g., capacity, pin, or timing constraints), and can even determine the runtime of the placement process.

BRIEF DESCRIPTION OF THE DRAWINGS

Various ones of the appended drawings merely illustrate example embodiments of the present disclosure and should not be considered as limiting its scope.

FIGS. 2-3 are flowcharts illustrating example methods for clustering pins of a circuit design for connection to a PG of the circuit design, according to some embodiments.

FIG. 5 is a set of circuit schematics that compare a clustering pin result by a traditional clustering process and a clustering pin result by a clustering process, according to some embodiments.

DETAILED DESCRIPTION

Figure 1:
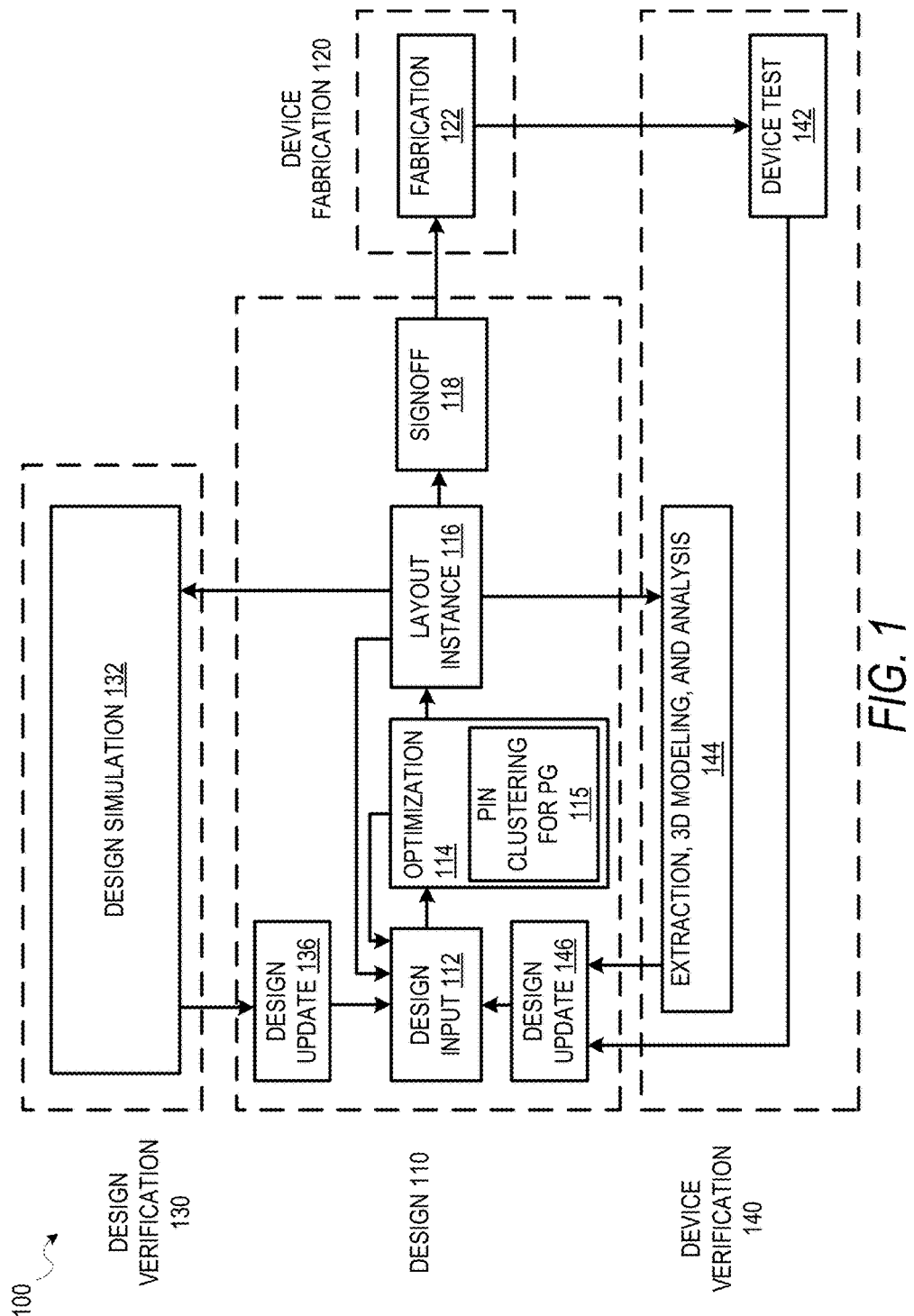
FIG. 1 is a diagram illustrating an example design process flow for clustering pins of a circuit design for connection to a power-ground network (PG) of the circuit design, according to some embodiments.

For circuit designs, traditional routing algorithms often handle routing connections between nodes and access points on a power-ground network (hereafter, referred to as a PG) of the circuit design. Unfortunately, such traditional routing algorithms result in nodes (e.g., pins) being connected to arbitrary PG access points, which can result in violation of PG connection constraints.

Various embodiments provide systems, methods, devices, and instructions for clustering pins of a circuit design for PG connection. Some such embodiments can connect some or all pins of a circuit design to one or more access points on the PG of the circuit design. Pin clustering, according to some embodiments, can permit one or more of the following: wirelength to be minimized; number of vias to be minimized; constraints of maximum number of pins per power-ground access point to be satisfied; and constraints of maximum bounding box size (containing pins per power-ground access point) to be satisfied.

According to some embodiments, a method finds a nearest access point to a power-ground (power-ground access point) for each pin in a set of pins (e.g., all the pins) of a circuit design. The method may continue by constructing a nearest neighbor graph, where an edge cost, of an edge in the nearest neighbor graph, represents a cost of merging clusters associated with two pins connected by the edge (e.g., routing cost between the two pins). From the lowest-cost edge to the highest-cost edge of the nearest neighbor graph, the method may continue by visiting each edge, selecting pins at the endpoints of each edge, and evaluating whether to merge clusters of the two pins into one cluster. The evaluation may involve, for example, determining one or more of the following: whether the two pins are associated with different clusters; whether the resulting merged pin cluster would violate a pin count limitation; whether the resulting merged pin cluster would violate a radius limitation for pin clusters; whether the resulting merged pin cluster would result in a wirelength increase; and whether the cost of merging the clusters of the two pins is lower than the cost of not merging them. Once these conditions (or constraints) have be satisfied, the method may proceed with merging the clusters of the two pins into one cluster. Subsequently, the visitation of edges, the selection of pins at the endpoints of the edges, the evaluation of merging clusters of two pins into one cluster, and the eventual merging of two clusters based on the evaluation are repeated for all edges in the nearest neighbor graph. Once this is completed, the method may end by routing pins in the same cluster together as one net (e.g., pins in the same cluster are connected together as a single net), and connecting the specific pin of each pin cluster that is nearest the PG to an access point of the PG (e.g., the access point nearest to that specific pin).

Depending on the embodiment, pin clustering as described herein may be applied during a primary or a secondary PG pin clustering process. Additionally, various embodiments described herein may cluster pins of a circuit design and find a PG access point for each pin cluster, while minimizing wirelength, vias, or both (e.g., after secondary PG routing).

As used herein, a routing cost can include a cost of connecting together two elements of a circuit design, and the cost may relate to wirelength, circuit timing, wire congestion, and wire reliability. With respect to a circuit design, a cluster cost of a particular pin cluster can represent a routing cost (e.g., minimum routing cost) to connect together pins of the particular pin cluster into a single network (net). Depending on the embodiment, a cluster cost may include any metric relating to a pin cluster that can negatively impact performance of a circuit design that includes the pin cluster. Additionally, it will be understood that for some embodiments described herein, merging pin clusters comprises merging more than two pin clusters together at a time.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for clustering pins of a circuit design for connection to a PG of the circuit design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in an optimization 114 operation, along with any other automated design processes. As shown, the optimization 114 operation includes a pin clustering for PG 115 operation, which may be performed in accordance with various embodiments described herein. While the design process flow 100 shows optimization occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the optimization 114 operation may be performed.

Figure 3:
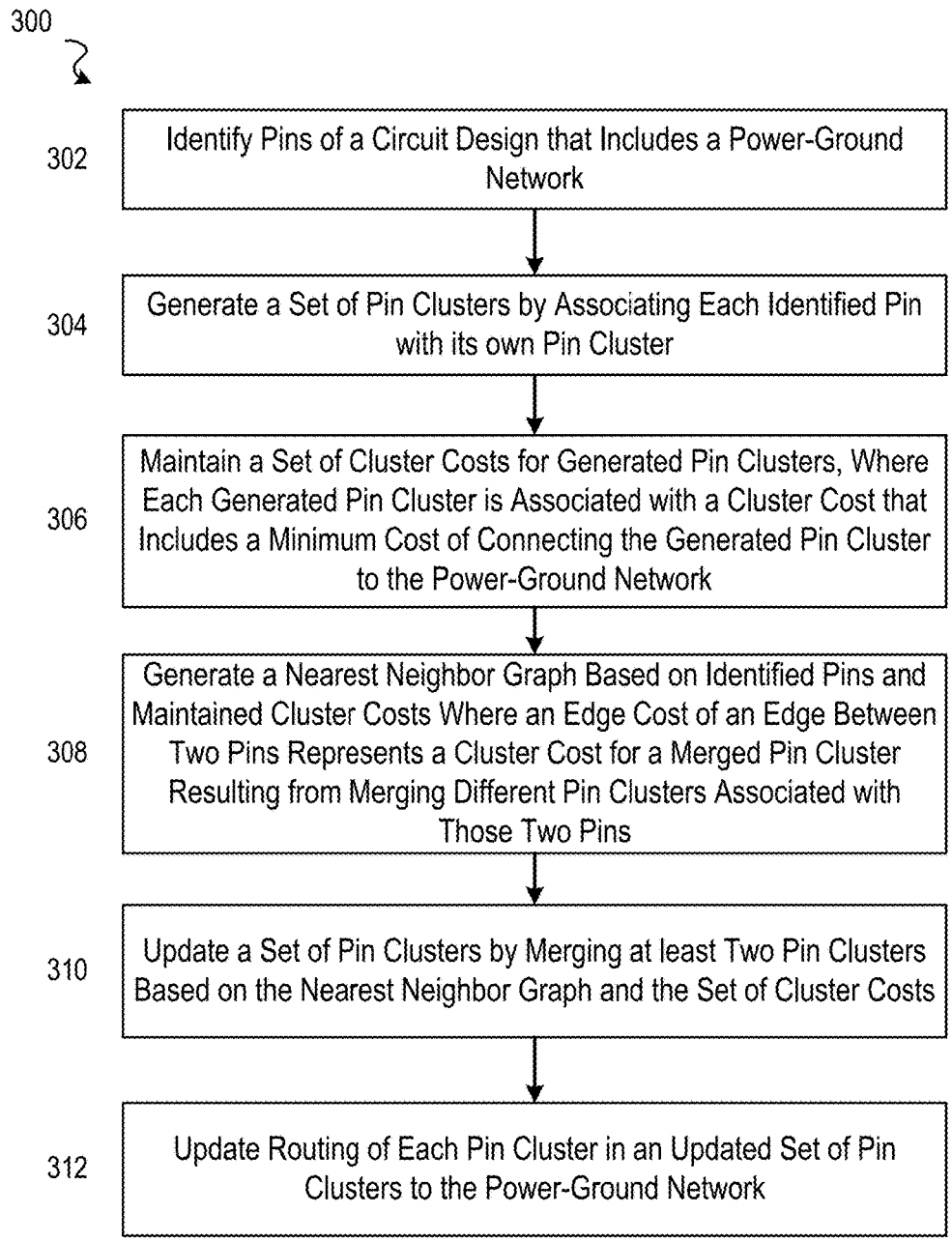

FIGS. 2-3 are flowcharts illustrating example methods for clustering pins of a circuit design for connection to a PG of the circuit design, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates an example method 200 for clustering pins of a circuit design for connection to a PG of the circuit design, according to some embodiments. For some embodiments, the method 200 is performed as part of a routing processing or routing optimization process applied to a circuit design (e.g., by a EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 generating a set of pin clusters by associating (e.g., assigning) each particular pin, in a plurality of pins of a circuit design, with its own pin cluster, where the circuit design includes a power-ground network (PG). In this way, operation 202 can set each pin to be a pin cluster itself and initialize the set of pin clusters. The plurality of pins may represent all or fewer than all of the pins included by the circuit design.

The method 200 continues with operation 204 maintaining a set of cluster costs for the set of pin clusters, where each particular pin cluster in the set of pin clusters is associated with a cluster cost in the set of cluster costs. A cluster cost associated with each particular pin cluster can include a minimum cost of connecting the particular pin cluster to the PG. This minimum cost may comprise the routing cost of connecting the pin of the particular pin cluster nearest the PG (i.e., the pin of the particular pin cluster having the shortest pin-to-PG connection) to an access point nearest the pin. Additionally, a cluster cost associated with each particular pin cluster may include a routing cost of connecting together the pins within the particular pin cluster. For some embodiments, maintaining the set of cluster costs for the set of pin clusters involves updating the set of cluster costs after the merger of two or more pin clusters. For instance, after two pin clusters are successfully merged, operation 204 may maintain the set of cluster costs by removing cluster costs for the pin clusters that are merged, and adding a new cluster cost for the new merged pin cluster to the set of cluster costs.

The method 200 continues with operation 206 generating a nearest neighbor graph based on the plurality of pins and the set of cluster costs. In particular, the nearest neighbor graph can be generated based on the geometric positions of the plurality of pins, relative to each other, on the circuit design. For some embodiments, the nearest neighbor graph includes a set of edges that connect the plurality of pins. Within the nearest neighbor graph, an edge cost of a particular edge (in the set of edges) between two pins can represent a merged cluster cost for a merged pin cluster that results from merging the different pin clusters associated with the two pins.

For various embodiments, the merged cluster cost represented by the edge cost comprises the total merged cluster cost of the resulting merged pin cluster. Depending on the embodiment, the total merged cluster cost for the merged pin cluster may include, without limitation, one or both of a routing cost (e.g., relating to wirelength, circuit timing, wire reliability, or wire congestion) of connecting pins within the merged pin cluster (e.g., original cluster cost of two pin clusters plus the routing cost of connecting the two pin clusters), and a routing cost of the shortest pin-to-PG connection for the merged pin cluster. Alternatively, for some embodiments, the merged cluster cost represented by the edge cost comprises an additional cluster cost used as a component of calculating the total merged cluster cost of the merged pin cluster (e.g., added to a cluster cost derived from the cluster costs of the individual pin clusters merged together).

Depending on embodiments, the nearest neighbor graph may comprise a k-nearest neighbor graph (k-NNG). Additionally, the nearest neighbor graph may be constructed, from the set of pin clusters of the circuit design, using a variety of existing methods, such as KGraph, which is a C++ library supporting k-nearest neighbor graph construction and search.

The method 200 continues with operation 208 updating the set of pin clusters by merging at least two pin clusters, in the set of pin clusters, based on the nearest neighbor graph and the set of cluster costs maintained by operation 204. For instance, while traversing the nearest neighbor graph that includes the set of pins and edges between pins of the set of pins, operation 208 may merge at least two pin clusters in the set of pin clusters in response to determining that the cost of merging the pin clusters is lower than the cost of not merging them, as defined by one or more cluster merging constraints.

More particularly, according to some embodiments, merging the at least two pin clusters is based on the nearest neighbor graph, based on the set of cluster costs, and further based on a set of cluster merging constraints, where the set of cluster merging constraints can determine whether the merger of the at least two pins clusters should be performed (e.g., the merged pin cluster should be accepted) or not performed (e.g., the merged pin cluster should be rejected). This process may involve traversing (e.g., visiting) each edge of the nearest neighbor graph, in order from the smallest edge cost to the largest edge cost. While doing so, the process can determine whether the set of cluster merging constraints is satisfied with respect to a first pin (first edge terminal) and a second pin (second edge terminal) based on the set of cluster costs, and in response to the set of cluster merging constraints being satisfied, merge a first pin cluster associated with the first pin and a second pin cluster associated with the second pin to produce a new merged pin cluster that replaces the first and second pin clusters.

Examples of cluster merging constraints can include, without limitation: a constraint that the pin clusters being merged be different from one another; a constraint relating to a pin count limitation; a constraint relating to a cluster radius limitation; a constraint relating to a bounding box size limitation; and a constraint relating to wirelength. A constraint relating to wirelength can include, for instance: a merged pin cluster must have a pin-to-PG connection that is shorter than that of any of the unmerged pin clusters being merged; or the wirelength of a merged pin cluster should not be longer than the sum of the wirelengths of the unmerged pin clusters being merged. In some instances, when two unmerged pin clusters are being merged as described herein, if the wirelength of a connection between the two unmerged pin clusters will be more than the longer pin-to-PG connection of the two unmerged pin clusters, this can be a strong indication that the wirelength of a merged pin cluster will be longer than the sum of the wirelengths of the unmerged pin clusters being merged.

Another example cluster merging constraint includes a constraint that a cluster cost change, resulting from the merging of the at least two pin clusters, does not surpass zero. For some embodiments, determining whether this example cluster merging constraint is satisfied comprises computing the cluster cost change based on the set of cluster costs, a given edge cost of a given edge between the first pin and the second pin in the nearest neighbor graph, a minimum cost of connecting a particular first pin from the first pin cluster to the PG at an access point nearest the particular first pin, and a minimum cost of connecting a particular second pin from the second pin cluster to the PG at an access point nearest the particular second pin.

More regarding updating the set of pin clusters by merging at least two pin clusters is discussed below with respect to FIG. 8.

Referring now to FIG. 3, the flowchart illustrates an example method 300 for clustering pins of a circuit design for connection to a PG of the circuit design, according to some embodiments. Like the method 200 of FIG. 2, the method 300 may be performed as part of a routing processing or routing optimization process applied to a circuit design. An operation of the method 300 may be performed by a hardware processor.

The method 300 as illustrated begins with operation 302 identifying a plurality of pins of a circuit design that includes a PG. Fewer than all of the pins of a circuit design may be identified by operation 302 as part of the plurality of pins. For instance, a user may select a subset of pins of the circuit design upon which the user wants to perform the method 300.

The method 300 continues with operation 304 generating a set of pin clusters by associating each particular pin, in the plurality of pins (identified by operation 302), with its own pin cluster. For some embodiments, operation 304 is similar to operation 202 of the method 200 described above with respect to FIG. 2.

The method 300 continues with operations 306, 308, and 310, which, according to some embodiments, are respectively similar to operations 204, 206, and 208 of the method 200 described above with respect to FIG. 2.

The method 300 continues with operation 312 updating routing of each given pin cluster, in the updated set of pin clusters produced by operation 310, to the PG. During operation 312, pins of a pin cluster in the updated set of pin clusters are routed together into one net, and in each result net, a specific pin that is nearest to the PG is connected to an access point of the PG. Additionally, operation 312 may result in routing of connections between other components of the circuit design to be updated in view of routing within pin clusters and routing between pin clusters and PG access points.

Figure 4:
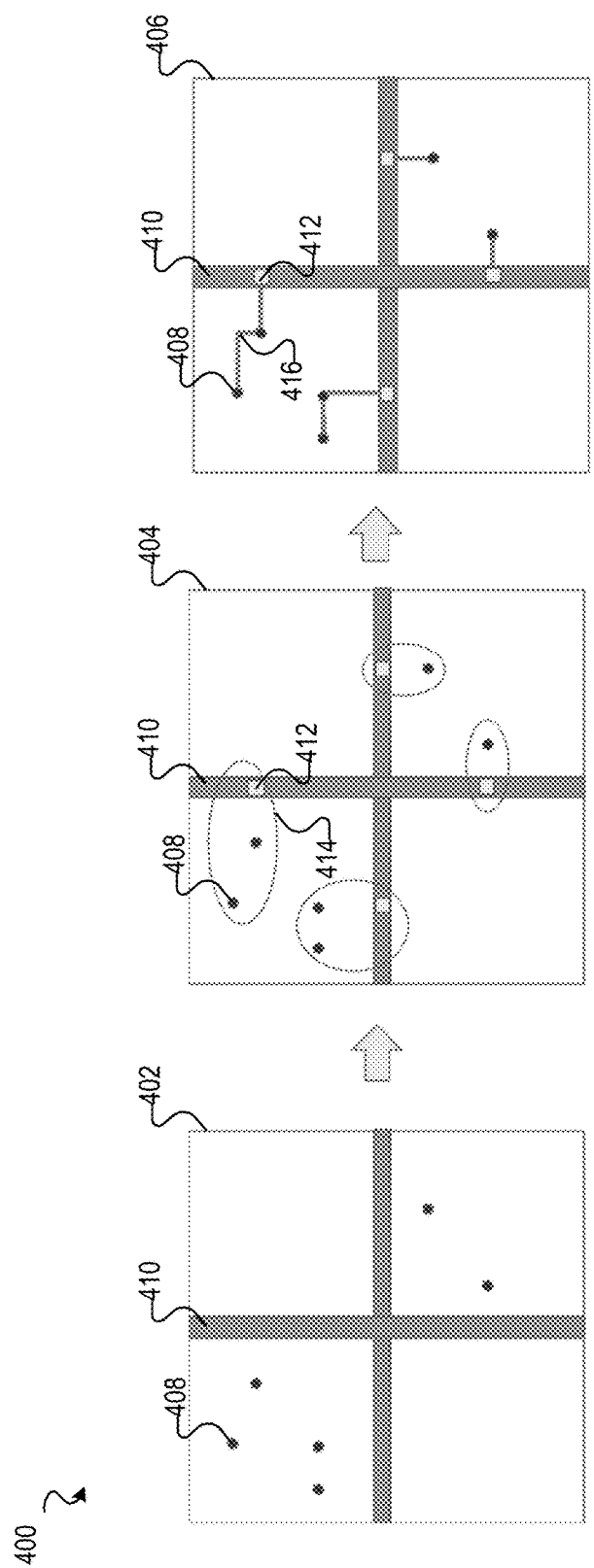
FIG. 4 is a series of circuit schematics that illustrate clustering of pins of an example circuit design, according to some embodiments.

FIG. 4 is a series 400 of circuit schematics 402-406 that illustrate clustering of pins of an example circuit design, according to some embodiments. As shown, the circuit schematics 402-406 illustrate pins 408 of the circuit design (represented by round dots), a power-ground network (PG) 410 of the circuit design (represented by the cross bars), access points 412 to the PG 410 (represented by square dots), pin clusters 414 (represented by ovals), and wires 416 (represented by thin lines between dots). In particular, the circuit schematic 402 depicts the pins 408 and the PG 410 of the circuit design prior to the pins 408 being clustered, in accordance with an embodiment. The circuit schematic 404 depicts pin clusters 414 that may result from pin clustering, in accordance with various embodiments, which may take into consideration the access points 412 nearest to a pin of each of the pin clusters 414. The circuit schematic 406 depicts routing the wires 416 between the pins 408 according to the pin clusters 414, and routing the wires 416 between each of the pin clusters 414 and the access points 412 nearest a pin of each of the pin clusters 414.

FIG. 5 is a set of circuit schematics 500 and 502 that compare a clustering pin result by a traditional clustering process and a clustering pin result by a clustering process, according to some embodiments. In particular, for a given circuit design including pins and a power grid, the circuit schematic 500 illustrates pin clustering and routing to a PG connection according to traditional means, while the circuit schematic 502 illustrates pin clustering and routing to a PG connection according to some embodiments. Comparatively speaking, the pin clustering and routing to the PG that produced the circuit schematic 500 uses more wirelength with respect to clustered pins 504 than does the embodiment that produced the circuit schematic 502, which kept pins 504 un-clustered and separately connected to the PG.

Figure 6:
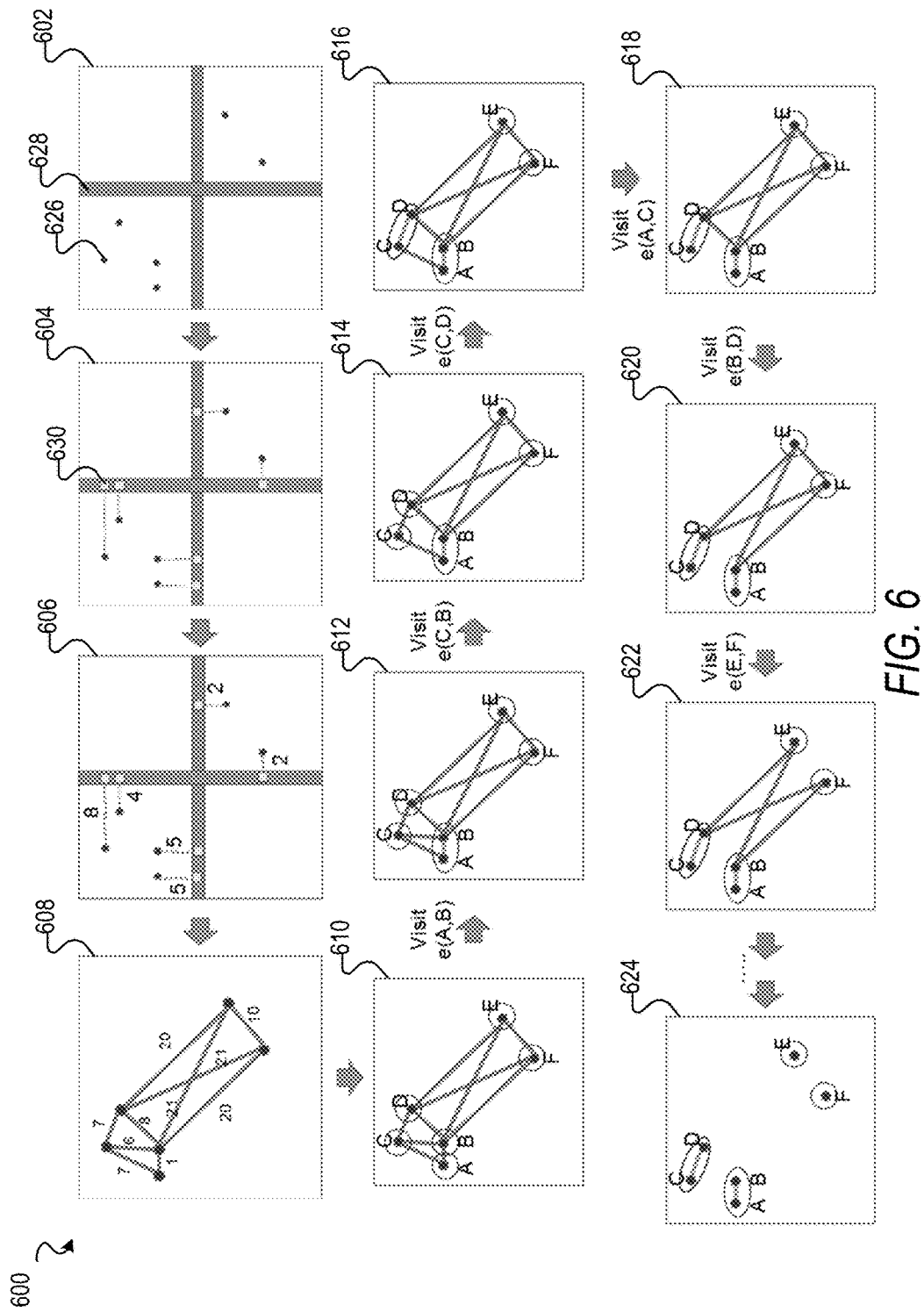
FIG. 6 is a series of circuit schematics and nearest neighbor graphs that illustrate clustering of pins of an example circuit design, according to some embodiments.

FIG. 6 is a series 600 of circuit schematics 602 through 606 and nearest neighbor graphs 608 through 624 that illustrate clustering of pins of an example circuit design, according to some embodiments. In particular, each of the circuit schematics 602 through 606 and the nearest neighbor graphs 608 through 624 represents a different stage of a pin clustering process, in accordance with some embodiments, being applied to a circuit design.

Beginning with the circuit schematic 602, the circuit schematic 602 illustrates pins 626 (represented by round dots) and a power-ground network (PG) 628 (represented by the cross bars) of a circuit design. Next, the circuit schematic 604 illustrates identification of access points 630 (represented by square dots), to the PG 628, nearest each of the pins 626. Next, the circuit schematic 606 illustrates determination of a routing cost of each of the pins 626 to its respective nearest access point 630.

The nearest neighbor graph 608 illustrates an example of nearest neighbor graph generated based on the pins 626 of the circuit schematic 606. As shown, the nearest neighbor graph 608 includes edges between pins, where the edge cost of each edge may represent a cost of merging clusters associated with two pins connected by that edge. The subsequent nearest neighbor graphs 610 through 624 illustrate traversal (e.g., visitation) of the edges of the nearest neighbor graph 608, from smallest edge cost to largest edge cost. According to some embodiments, upon traversal of a particular edge, if the pins connected by the particular edge are associated with (e.g., assigned to) different clusters, the different clusters may be considered for merger upon satisfaction of a set of cluster merging constraints. Examples of cluster merging constraints can include, without limitation, a pin count constraint (e.g., a number of pins in each cluster, or a number of pins per power-ground access point, cannot be larger than a given threshold), a radius constraint (e.g., a pin cluster cannot be longer than a given distance), a bounding box size constraint, or a wirelength constraint (e.g., the merged pin cluster cannot have a longer wirelength than the combined wirelengths of the two unmerged pin clusters, or the merged pin cluster cannot have a longer pin-to-PG connection than either of the two unmerged pin clusters). For some embodiments, if one of the cluster merging constraints of the set is violated (e.g., wirelength increase), the merger of the two pin clusters would be rejected. For purposes of the example illustrated by FIG. 6, the pin count constraint comprises a count of two. The nearest neighbor graph 624 depicts the pin clustering that results upon traversal of all the edges of the nearest neighbor graph 608. More regarding generation and use of a nearest neighbor graph during pin clustering, in accordance with some embodiments, is discussed below with respect to FIG. 8.

Figure 7:
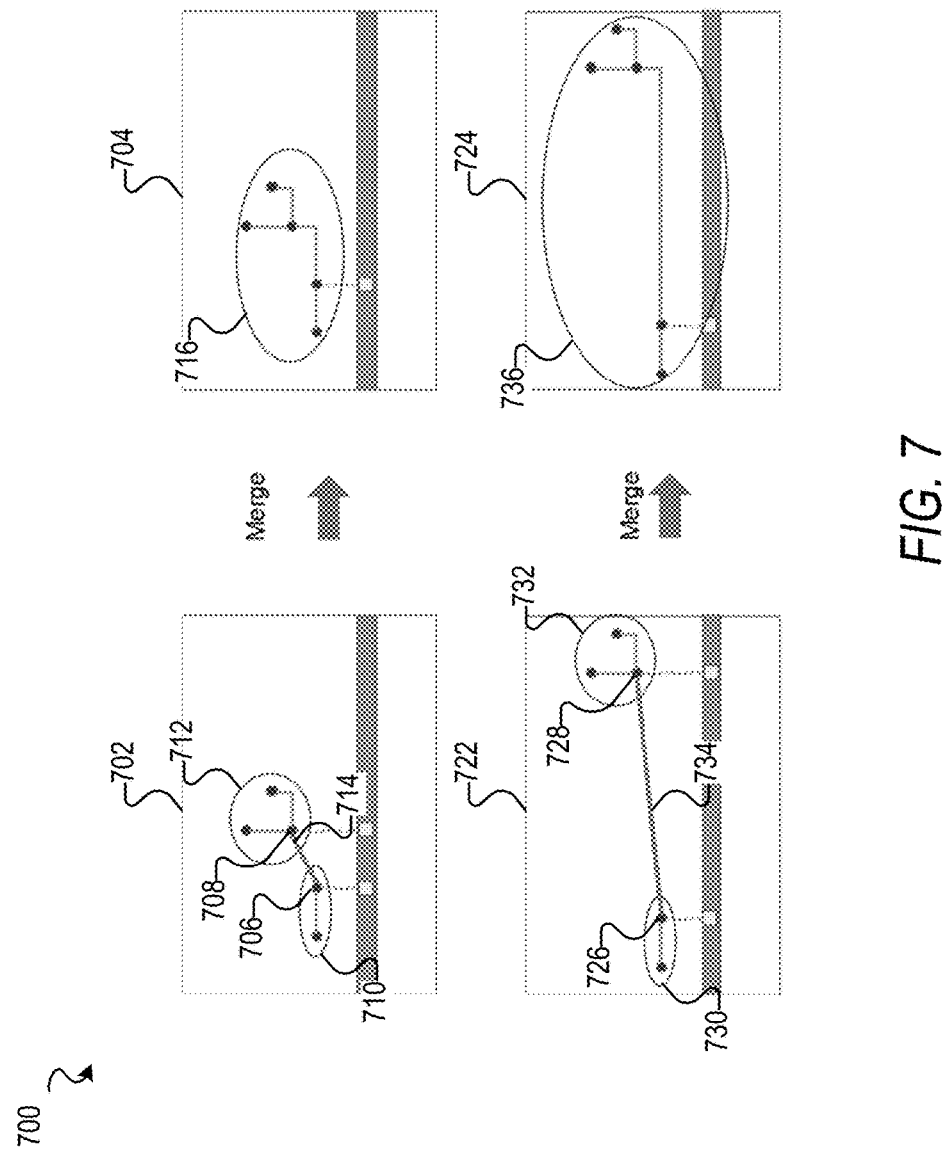
FIG. 7 is a set of circuit schematics that illustrate merging of pin clusters of an example circuit design, according to some embodiments.

FIG. 7 is a set 700 of circuit schematics 702, 704, 722, and 724 that illustrate merging of pin clusters of an example circuit design, according to some embodiments. According to some embodiments, a pin clustering process described herein generates and uses (e.g., traverses) a nearest neighbor graph to evaluate the merger of a pin cluster 710 associated with a pin 706 and a pin cluster 712 associated with a pin 708, where the pins 706 and 708 are connected by an edge 714 of the nearest neighbor graph. During the pin clustering process, the cluster cost of the pin cluster 710, the cluster cost of the pin cluster 712, and an edge cost of the edge 714 may be considered in view of a set of cluster merging constraints (e.g., relating to wirelength, pin count, cluster cost, and the like) to determine whether a resulting merged pin cluster 716 should be rejected or accepted by the pin clustering process.

Likewise, the pin clustering process may generate and use the same nearest neighbor graph to evaluate a pin cluster 730 associated with a pin 726 and a pin cluster 732 associated with a pin 728, where the pins 726 and 728 are connected by an edge 734 of the nearest neighbor graph. During the pin clustering process, the cluster cost of the pin cluster 730, the cluster cost of the pin cluster 732, and an edge cost of the edge 734 may be considered in view of a set of cluster merging constraints to determine whether a resulting merged pin cluster 736 should be rejected or accepted by the pin clustering process.

For some embodiments, the circuit schematics 702 and 704 illustrate an example merger of two pin clusters that would be accepted (e.g., successful) in view of a particular set of cluster merging constraints, while the circuit schematics 722 and 724 illustrate an example merger of two pin clusters that would be rejected in view of the (same) particular set of cluster merging constraints.

For instance, as depicted by the circuit schematics 704 and 724, the resulting merged pin cluster 736 includes a longer wirelength than the resulting merged pin cluster 716.

Where an example cluster merging constraint includes a wirelength limit, a pin clustering process described herein may determine that the wirelength of the resulting merged pin cluster 716 is less than or equal to the wirelength limit, and determine that the wirelength of the resulting merged pin cluster 736 surpasses the wirelength limit by the pin clustering process. In such an example, the resulting merged pin cluster 716 may be accepted by the pin clustering process, while the resulting merged pin cluster 736 is not.

In another instance, an example cluster merging constraint may include that a resulting merged pin cluster cannot have a longer wirelength than the combined wirelengths of the two unmerged pin clusters being merged. In view of this, a pin clustering process described herein may determine that the wirelength of the resulting merged pin cluster 716 is less than the combined wirelengths of the pin clusters 710 and 712, and determine that the wirelength of the resulting merged pin cluster 736 is greater than the combined wirelengths of the pin clusters 730 and 732. In such an instance, the resulting merged pin cluster 716 may be accepted by the pin clustering process, while the resulting merged pin cluster 736 is not.

In yet another instance, an example cluster merging constraint may include that the change in cluster cost caused by a resulting merged pin cluster should not be positive (i.e., be a cost increase) over the maximum cluster costs of either of the two unmerged pin clusters being merged. In view of this, a pin clustering process described herein may determine that the cluster cost of the resulting merged pin cluster 716 causes a negative cluster cost change relative to the cluster costs of the pin cluster 710 and the pin cluster 712, and determine that the cluster cost of the resulting merged pin cluster 736 causes a positive cluster cost change (i.e., an increase in cluster cost) relative to the cluster costs of the pin cluster 730 and the pin cluster 732. More regarding cluster merging constraints and cluster cost changes is discussed below with respect to FIG. 8.

Figure 8:
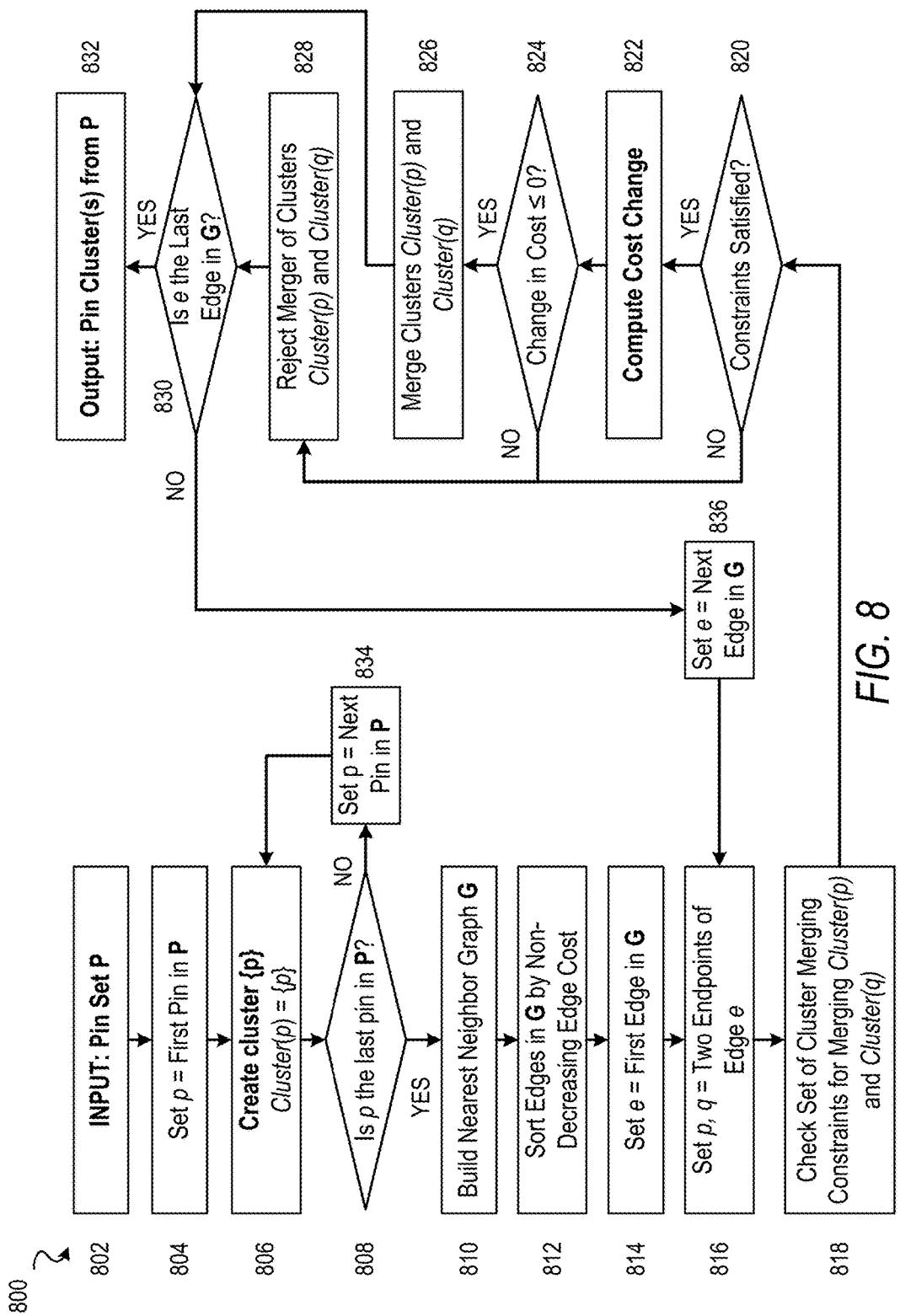
FIG. 8 is a flowchart illustrating an example method for clustering pins of a circuit design for connection to a PG of the circuit design, according to some embodiments.

FIG. 8 is a flowchart illustrating an example method 800 for clustering pins of a circuit design for connection to a PG of the circuit design, according to some embodiments. For some embodiments, the method 800 is performed as part of a routing processing or routing optimization process applied to a circuit design (e.g., by a EDA software system). Additionally, for some embodiments, the method 800 represents one or more operations performed by the method 200 of FIG. 2 and the method 300 of FIG. 3. The following Table 1 provides some definitions that may be used with respect to the method 800.

TABLE 1

| | |
|---|---|
| p | A pin p. |
| P | A set of all pins P. |
| C | A cluster of pins C = $\{p_1, p_2, \ldots, p_n\}$ |
| Cluster(p) | Pin cluster which contains pin p. |
| $Cost_{PG}(p)$ | Routing cost of connecting pin p to the nearest PG access point. |
| $Cost_{PG}(C)$ | The minimum routing cost of connecting a pin $p \in C$ to its nearest PG access point. For example, $Cost_{PG}(C_1 + C_2)$ = min($Cost_{PG}(C_1)$, $CostPG(C_2)$). |
| $Cost_{clu}(C)$ | Routing cost of the cluster C. |
| $Cost_{edge}(p, q)$ | Routing cost applied on $Cost_{clu}$ of merging Cluster(p) and Cluster(q) into one, assuming pin p and pin q are not in the same cluster. |
| Cost(C) | Total routing cost of a cluster, where: Cost(C) = $Cost_{PG}(C) + Cost_{clu}(C)$. |

The method 800 begins at operation 802 with the receiving as input of a pin set P of a circuit design (e.g., an identified plurality of pins of the circuit design). Next, operation 804 initially sets pin p to be the first pin in pin set P. Next, operation 806 creates a new pin cluster containing only pin p by Cluster(p)={p}. Next, if at operation 808, pin p is the last pin in pin set P, then the method 800 proceeds to operation 810, and, if not, the method 800 proceeds to operation 834, where pin p is set to the next pin in pin set P. By way of operations 804, 806, 808, and 834, each pin p in pin set P is assigned to its own pin cluster.

At operation 810, nearest neighbor graph G is built (e.g., generated) for the pins in pin set P. In particular, the nearest neighbor graph can be built based on the geometric positions of pins in pin set P, relative to each other, on the circuit design. Nearest neighbor graph G may be built such that an edge cost $Cost_{edge}(p,q)$ between pin p and pin q of pin set P represents a total routing cost (or an additional routing cost that is applied to) $Cost_{clu}$ of merging Cluster(p) and Cluster(q) into one (assuming pin p and pin q are not in the same pin cluster). As an additional routing cost that is applied to the $Cost_{clu}$ of merging Cluster(p) and Cluster(q), $Cost_{edge}(p,q)$ may be applied as follows:

$$Cost_{clu}(Cluster(p) + Cluster(q)) =$$
$$Cost_{clu}(Cluster(p)) + Cost_{clu}(Cluster(q)) + \min_{p_i, p_j \in P, i \neq j}(Cost_{edge}(p_i, p_j))$$

Next, at operation 812, the edges of nearest neighbor graph G are sorted by non-decreasing edge order. Subsequently, operation 814 sets edge e to the first edge in nearest neighbor graph G as sorted by operation 812. Then, operation 816 sets pins p,q to the endpoints of edge e. Next, operation 818 checks whether a set of cluster merging constraints, as described herein, are satisfied for merging Cluster(p) and Cluster(q). For some embodiments, the set of cluster merging constraints can include one or more of what is listed in the following Table 2.

TABLE 2

| |
|---|
| Cluster(p) ≠ Cluster(q) (pin clusters are different) |
| \|Cluster(p)\| + \|Cluster(q)\| ≤ number of pins limit (a pin cluster size limit) |
| max($p_x - q_x$, p, q ∈ (Cluster(p) + Cluster(q))) + max($p_y - q_y$, p, q ∈ (Cluster(p) + Cluster(q))) ≤ size limit (a bounding box size limit) |

If at operation 820, the set of cluster merging constraints are determined to be satisfied, then the method 800 proceeds to operation 822, and, if not, the method 800 proceeds to operation 828. At operation 822, a cost change for merging Cluster(p) and Cluster(q) is computed and, at operation 824, it is determined whether the cost change surpasses zero. Though illustrated as operations that are separate from operation 818, for some embodiments, operations 822 and 824 represent another cluster merging constraint that is determined for merging Cluster(p) and Cluster(q) (e.g., a cluster merging constraint that the cluster cost for merging Cluster(p) and Cluster(q) should not increase).

For some embodiments, the cost change is computed according to the following, which represents replacing the total routing costs of pin clusters Cluster(p) and Cluster(q) with a merged pin cluster Cluster(p)+Cluster(q), where $C_1$=Cluster(p) and $C_2$=Cluster(p).

$\Delta Cost = Cost(C_1 + C_2) - (Cost(C_1) + Cost(C_2)) = Cost_{clu}(C_1) + Cost_{clu}(C_2) + Cost_{edge}(p,q) + \min(Cost_{PG}$ $(C_1),Cost_{PG}(C_2))-Cost_{clu}(C_1)-Cost_{PG}(C_1)-Cost_{clu}(C_2)-Cost_{PG}(C_2)=Cost_{edge}(p,q)-\max(Cost_{PG}(C_1),Cost_{PG}(C_2))$ The following is a reduced version of the foregoing.

$$\Delta Cost = Cost_{edge}(p,q) - \max(Cost_{PG}(Cluster(p)), Cost_{PG}(Cluster(q)))$$

Continuing with operation 824, if it is determined that the cost change computed at operation 822 is less than or equal to zero, the method 800 proceeds to operation 826, and, if not, the method 800 proceeds to operation 828. At operation 826, Cluster(p) and Cluster(q) are merged into one pin cluster. After operation 826, the method 800 proceeds to operation 830. At operation 828, the merger of Cluster(p) and Cluster(q) is rejected, and the method 800 continues to operation 830.

Operation 830 determines whether edge e is the last edge in nearest neighbor graph G as sorted by operation 812. If edge e is the last edge, then operation 832 outputs the set of the pin clusters generated by operations of the method 800 thus far. If edge e is not the last edge, the method 800 proceeds to operation 836, where edge e is set to the next edge in nearest neighbor graph G as sorted by operation 812, and then proceeds to operation 816. In this way, the method 800 can traverse all the edges in nearest neighbor graph G.

Figure 9:
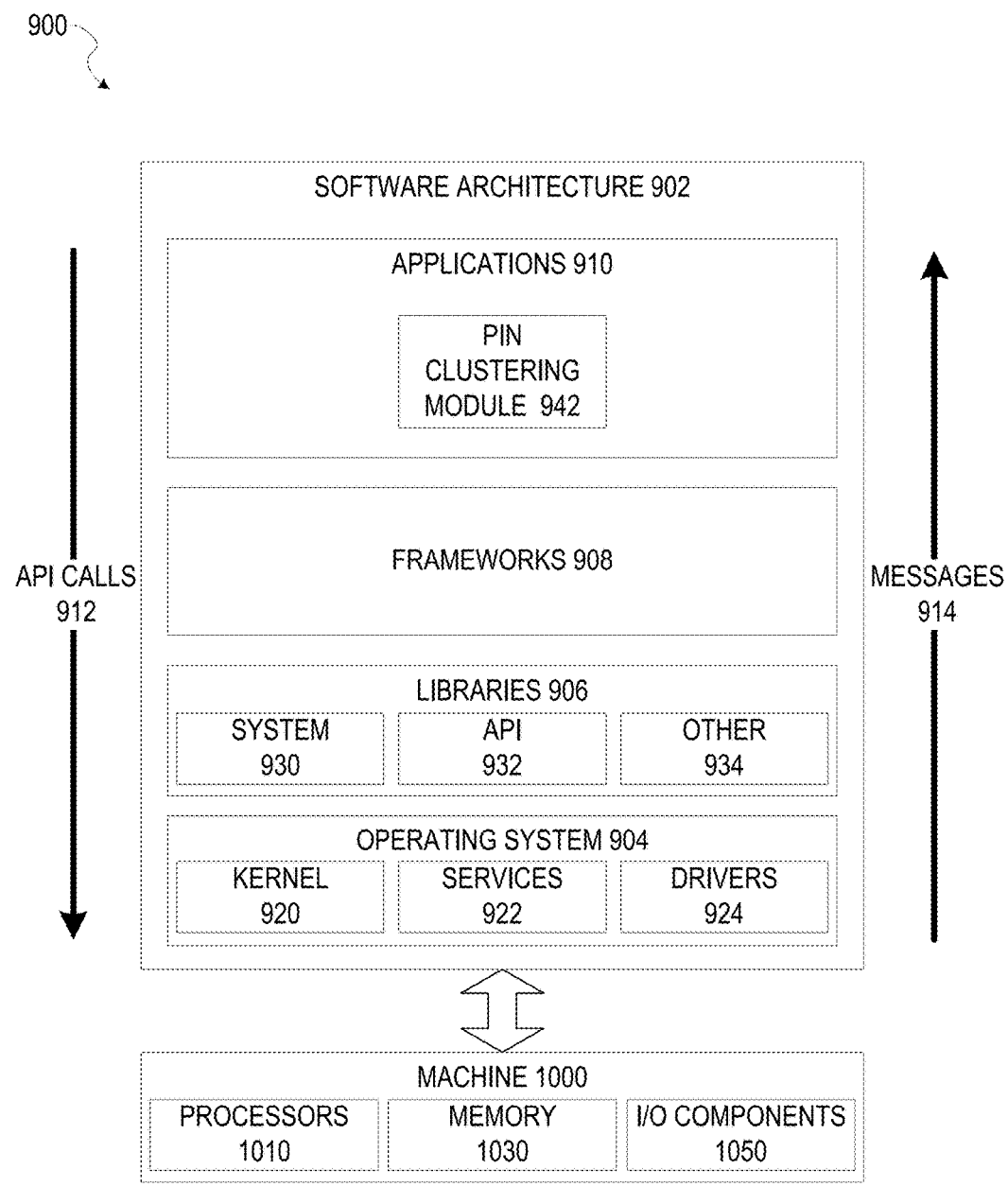
FIG. 9 is a block diagram illustrating an example of a software architecture that may be operating on an electronic design automation (EDA) computing device and may be used with methods for clustering pins of a circuit design for power-ground network connection, according to some embodiments.

FIG. 9 is a block diagram 900 illustrating an example of a software architecture 902 that may be operating on an EDA computer and may be used with methods for clustering pins of a circuit design for connection to a PG of the circuit design, according to some example embodiments. The software architecture 902 can be used as an EDA computing device to implement any of the methods described above. Aspects of the software architecture 902 may, in various embodiments, be used to store circuit designs, execute pin clustering for connection to a PG, and route pin clusters to PGs in an EDA environment to generate circuit designs, with physical devices generated using these circuit designs.

FIG. 9 is merely a non-limiting example of a software architecture 902, and it will be appreciated that many other architectures can be implemented to facilitate the functionality described herein. In various embodiments, the software architecture 902 is implemented by hardware such as a machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, software frameworks 908, and applications 910. Operationally, the applications 910 invoke application programming interface (API) calls 912 through the software stack and receive messages 914 in response to the API calls 912, consistent with some embodiments. In various embodiments, any client device, any server computer of a server system, or any other device described herein may operate using elements of the software architecture 902. An EDA computing device described herein may additionally be implemented using aspects of the software architecture 902, with the software architecture 902 adapted for operating to perform pin clustering for connection to a PG in any manner described herein, and further adapted for routing pin clusters that result to the PG.

In one embodiment, an EDA application of the applications 910 performs pin clustering according to embodiments described herein using various modules within the software architecture 902. For example, in one embodiment, an EDA computing device similar to the machine 1000 includes the memory 1030 and the one or more processors 1010. The processors 1010 also implement a pin clustering module 942 to execute pin clustering for connection to a PG, so that the resulting pin clusters can be routed to the PG.

In various other embodiments, rather than being implemented as modules of the one or more applications 910, the pin clustering module 942 may be implemented using elements of the libraries 906, the operating system 904, or the software frameworks 908.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 such as libraries of blocks for use in an EDA environment, or other libraries that can provide functions such as memory allocation functions, string manipulation functions, mathematic functions, and the like. In addition, the libraries 906 can include API libraries 932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include other libraries 934.

The software frameworks 908 provide a high-level common infrastructure that can be utilized by the applications 910, according to some embodiments. For example, the software frameworks 908 provide various graphic user interface (GUI) functions, high-level resource management, high-level location services, and so forth. The software frameworks 908 can provide a broad spectrum of other APIs that can be utilized by the applications 910, some of which may be specific to a particular operating system 904 or platform. In various embodiments, the systems, methods, devices, and instructions described herein may use various files, macros, libraries, and other elements of an EDA design environment to implement pin clustering for connection to a PG described herein. This includes analysis of input design files for an integrated circuit design, along with any element of hierarchical analysis that may be used as part of or along with the embodiments described herein. While netlist files, library files, SDC files, and view definition files are examples that may operate within the software architecture 902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some example embodiments, the processors 1010 or processor-implemented modules are located in a single geographic location (e.g., within a home environment, an office environment, or a server farm). In other example embodiments, the processors or processor-implemented modules are distributed across a number of geographic locations.

Figure 10:
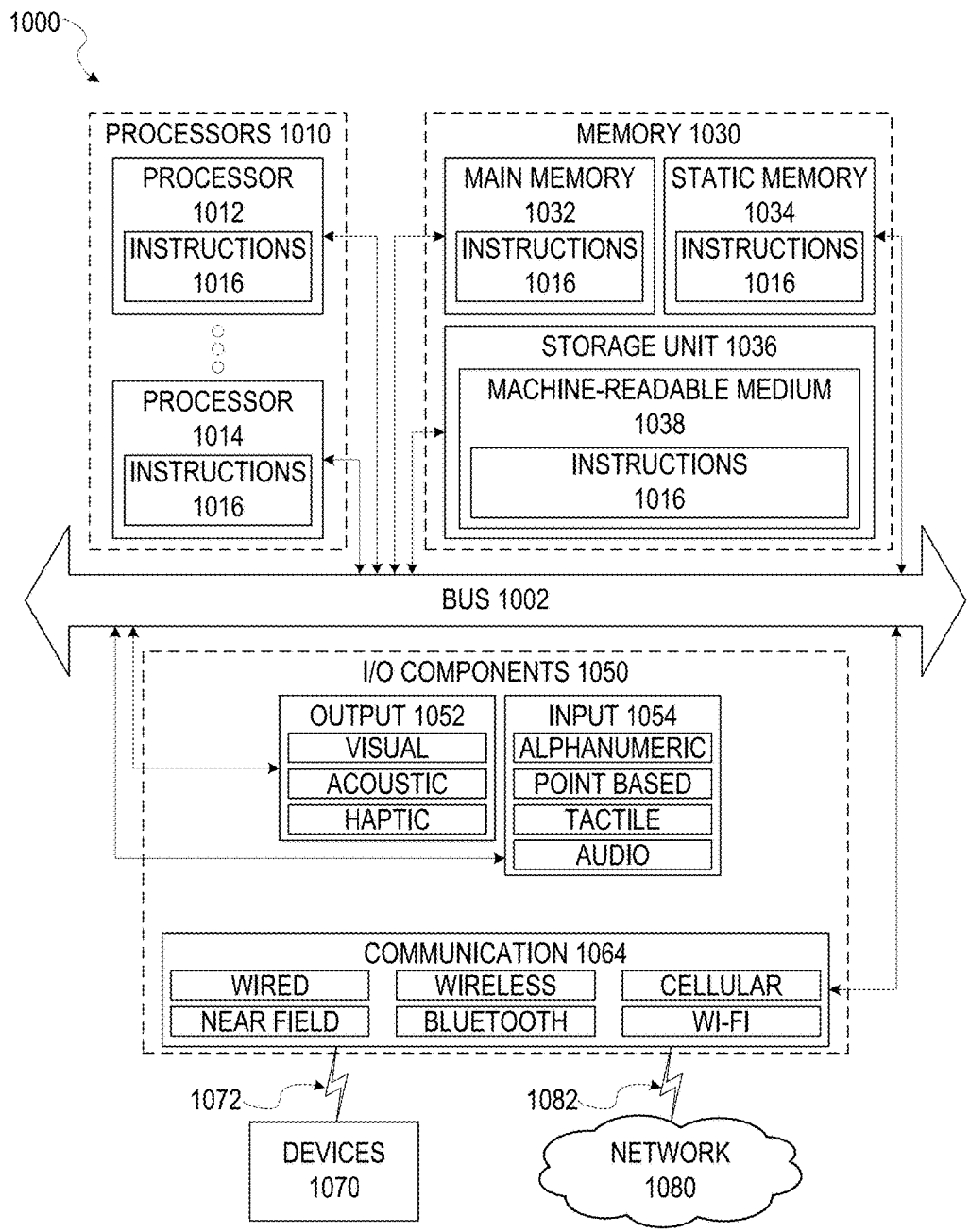
FIG. 10 is a diagram representing a machine in the form of a computer system within which a set of instructions are executed, causing the machine to perform any one or more of the methods discussed herein, according to some example embodiments.

FIG. 10 is a diagrammatic representation of the machine 1000 in the form of a computer system within which a set of instructions may be executed for causing the machine 1000 to perform any one or more of the methodologies discussed herein, according to an example embodiment. FIG. 10 shows components of the machine 1000, which is, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1010 with a single core, multiple processors 1010 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. In various embodiments, pin clustering is used to generate routing updates and changes to a circuit design, and circuit design output files are used to generate masks and other physical outputs for generation of a circuit. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling.

Furthermore, the machine-readable medium 1038 is non-transitory (in other words, not having any transitory signals) in that it does not embody a propagating signal. However, labeling the machine-readable medium 1038 "non-transitory" should not be construed to mean that the machine-readable medium 1038 is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to" or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    generating, by a hardware processor, a set of pin clusters by associating each particular pin, in a plurality of pins of a circuit design, with its own pin cluster, the circuit design including a power-ground network;
    maintaining, by the hardware processor, a set of cluster costs for the set of pin clusters, wherein each particular pin cluster in the set of pin clusters is associated with a cluster cost in the set of cluster costs and includes a minimum cost of connecting the particular pin cluster to the power-ground network;
    generating, by the hardware processor, a nearest neighbor graph based on the plurality of pins, wherein the nearest neighbor graph includes a set of edges that connect the plurality of pins, wherein the set of edges includes a particular edge between two pins, and wherein an edge cost of the particular edge represents a merged cluster cost for a merged pin cluster that results from merging different pin clusters associated with the two pins;
    updating, by the hardware processor, the set of pin clusters by merging at least two pin clusters, in the set of pin clusters, based on the nearest neighbor graph and the set of cluster costs; and
    updating, by an electronic design automation software system operating by the hardware processor, routing of the circuit design based on the updated set of pin clusters.

2. The method of claim 1, wherein the merging the at least two pin clusters is further based on a set of cluster merging constraints, and wherein the merging the at least two pin clusters based on the nearest neighbor graph, the set of cluster costs, and the set of cluster merging constraints comprises:
    for each edge in the nearest neighbor graph between a first pin and a second pin, in order from smallest edge cost to largest edge cost:
    determining whether the set of cluster merging constraints is satisfied with respect to the first pin and the second pin based on the set of cluster costs; and
    in response to the set of cluster merging constraints being satisfied with respect to the first pin and the second pin, merging a first pin cluster associated with the first pin and a second pin cluster associated with the second pin to produce a new merged pin cluster, and replacing the first pin cluster and the second pin cluster with the new merged pin cluster.

3. The method of claim 2, wherein the set of cluster merging constraints includes a constraint that the first pin cluster be different from the second pin cluster.

4. The method of claim 2, wherein the set of cluster merging constraints includes a constraint that a cluster cost change, resulting from the merging the at least two pin clusters, be less than or equal to zero.

5. The method of claim 4, wherein the determining whether the set of cluster merging constraints is satisfied comprises:
computing the cluster cost change based on the set of cluster costs, a given edge cost of a given edge between the first pin and the second pin in the nearest neighbor graph, a minimum cost of connecting a particular first pin from the first pin cluster to the power-ground network at an access point nearest the particular first pin, and a minimum cost of connecting a particular second pin from the second pin cluster to the power-ground network at an access point nearest the particular second pin.

6. The method of claim 2, wherein the set of cluster merging constraints includes a constraint relating to at least one of a pin count limitation, a cluster radius limitation, or a bounding box size limitation.

7. The method of claim 1, wherein the minimum cost of connecting the particular cluster to the power-ground network comprises a lowest cost of connecting any pin associated with the particular pin cluster to its nearest access point to the power-ground network.

8. The method of claim 1, wherein the merged cluster cost includes a summation of individual cluster costs of the different pin clusters.

9. The method of claim 1, wherein the merged cluster cost includes a routing cost of connecting the two pins, the routing cost relating to at least one of wirelength, circuit timing, wire reliability, or wire congestion.

10. The method of claim 1, wherein the updating routing of the circuit design based on the updated set of pin clusters comprises updating routing of each pin cluster, in the updated set of pin clusters, to the power-ground network.

11. A device comprising:
a memory storing instructions; and
a hardware processor communicatively coupled to the memory and configured by the instructions to:
generate a set of pin clusters by associating each particular pin, in a plurality of pins of a circuit design, with its own pin cluster, the circuit design including a power-ground network;
maintain a set of cluster costs for the set of pin clusters, each particular pin cluster, in the set of pin clusters, being associated with a cluster cost, in the set of cluster costs, that includes a minimum cost of connecting the particular pin cluster to the power-ground network;
generate a nearest neighbor graph based on the plurality of pins, wherein the nearest neighbor graph includes a set of edges that connect the plurality of pins, wherein the set of edges includes a particular edge between two pins, and wherein an edge cost of the particular edge represents a merged cluster cost for a merged pin cluster that results from merging different pin clusters associated with the two pins;
update the set of pin clusters by merging at least two pin clusters, in the set of pin clusters, based on the nearest neighbor graph and the set of cluster costs; and
update routing of the circuit design based on the updated set of pin clusters.

12. The device of claim 11, wherein the merging the at least two pin clusters is further based on a set of cluster merging constraints, and wherein the merging the at least two pin clusters based on the nearest neighbor graph, the set of cluster costs, and the set of cluster merging constraints comprises:
for each edge in the nearest neighbor graph between a first pin and a second pin, in order from smallest edge cost to largest edge cost:
determining whether the set of cluster merging constraints is satisfied with respect to the first pin and the second pin based on the set of cluster costs; and
in response to the set of cluster merging constraints being satisfied with respect to the first pin and the second pin, merging a first pin cluster associated with the first pin and a second pin cluster associated with the second pin to produce a new merged pin cluster, and replacing the first pin cluster and the second pin cluster with the new merged pin cluster.

13. The device of claim 12, wherein the set of cluster merging constraints includes a constraint that the first pin cluster be different from the second pin cluster.

14. The device of claim 12, wherein the set of cluster merging constraints includes a constraint that a cluster cost change, resulting from the merging the at least two pin clusters, be less than or equal to zero.

15. The device of claim 14, wherein the determining whether the set of cluster merging constraints is satisfied comprises:
computing the cluster cost change based on the set of cluster costs, a given edge cost of a given edge between the first pin and the second pin in the nearest neighbor graph, a minimum cost of connecting a particular first pin from the first pin cluster to the power-ground network at an access point nearest the particular first pin, and a minimum cost of connecting a particular second pin from the second pin cluster to the power-ground network at an access point nearest the particular second pin.

16. The device of claim 12, wherein the set of cluster merging constraints includes a constraint relating to at least one of a pin count limitation, a cluster radius limitation, or a bounding box size limitation.

17. The device of claim 11, wherein the minimum cost of connecting the particular pin cluster to the power-ground network comprises a lowest cost of connecting any pin associated with the particular pin cluster to its nearest access point to the power-ground network.

18. The device of claim 11, wherein the merged cluster cost includes a summation of individual cluster costs of the different pin clusters.

19. The device of claim 11, wherein the merged cluster cost includes a routing cost of connecting the two pins, the routing cost relating to at least one of wirelength, circuit timing, wire reliability, or wire congestion.

20. A non-transitory computer-readable medium comprising instructions that, when executed by a hardware processor of a device, cause the device to perform operations comprising:
identifying a plurality of pins of a circuit design, the circuit design including a power-ground network;
generating a set of pin clusters by associating each particular pin, in the plurality of pins, with its own pin cluster;

maintaining a set of cluster costs for the set of pin clusters, wherein each particular pin cluster in the set of pin clusters is associated with a cluster cost in the set of cluster costs and includes a minimum cost of connecting the particular pin cluster to the power-ground network;

generating a nearest neighbor graph based on the plurality of pins and the set of cluster costs, wherein the nearest neighbor graph includes a set of edges that connect the plurality of pins, wherein the set of edges includes a particular edge between two pins, and wherein an edge cost of the particular edge represents a merged cluster cost for a merged pin cluster that results from merging different pin clusters associated with the two pins;

updating the set of pin clusters by merging at least two pin clusters, in the set of pin clusters, based on the nearest neighbor graph and the set of cluster costs; and updating routing of the circuit design based on the updated set of pin clusters.

* * * * *